(12) United States Patent
Liang

(10) Patent No.: US 12,480,529 B1
(45) Date of Patent: Nov. 25, 2025

(54) ROTARY LOCKING STRUCTURE AND FOLDABLE FAN

(71) Applicant: Guangdong Qbill Industrial Co., Ltd., Foshan (CN)

(72) Inventor: Shengquan Liang, Foshan (CN)

(73) Assignee: Guangdong Qbill Industrial Co., Ltd., Foshan (CN)

( * ) Notice: Subject to any disclaimer, the term of this patent is extended or adjusted under 35 U.S.C. 154(b) by 0 days.

(21) Appl. No.: 19/070,831

(22) Filed: Mar. 5, 2025

(30) Foreign Application Priority Data

Dec. 27, 2024 (CN) .......................... 202411945467.3

(51) Int. Cl.
F04D 29/64 (2006.01)
F16M 11/10 (2006.01)

(52) U.S. Cl.
CPC .......... F04D 29/646 (2013.01); F16M 11/10 (2013.01)

(58) Field of Classification Search
CPC .............................. F04D 29/646; F16M 11/10
See application file for complete search history.

(56) References Cited

U.S. PATENT DOCUMENTS

| | | | |
|---|---|---|---|
| 6,862,779 B1* | 3/2005 | Lu .......................... | G06F 1/1616 16/337 |
| 2008/0256748 A1* | 10/2008 | Saito .................... | F16M 13/027 16/321 |
| 2009/0271948 A1* | 11/2009 | Wang .................... | G06F 1/1681 16/337 |
| 2009/0320240 A1* | 12/2009 | Wang .................... | G06F 1/1681 16/231 |
| 2018/0128309 A1* | 5/2018 | Yonemaru ............... | F16C 11/10 |
| 2018/0163920 A1* | 6/2018 | Zhao ..................... | G03B 17/56 |

FOREIGN PATENT DOCUMENTS

CN 215333568 U * 12/2021
CN 216922578 U 7/2022

* cited by examiner

*Primary Examiner* — Nathaniel E Wiehe
*Assistant Examiner* — Theodore C Ribadeneyra

(57) ABSTRACT

Provided are a rotary locking structure and a foldable fan. The rotary locking structure, comprising a rotating seat, a fixed seat, a fixed lining ring, an elastic lining ring and a rotating rod, wherein one end of the rotating seat is provided with a first socket cylinder, the fixed seat is provided with a sleeve, and one end of the sleeve is fixedly connected to a second socket cylinder; the rotating rod comprises a rod body and a rod seat; a plurality of supporting bridges are formed on the elastic lining ring, and the supporting bridges are arranged to generate elastic deformation in an axis direction of the elastic lining ring; and locking clamping seats protruding towards the fixed lining ring are formed on two centrally symmetric supporting bridges, an outer contour of one of the locking clamping seats is arc-shaped.

8 Claims, 8 Drawing Sheets

ROTARY LOCKING STRUCTURE AND FOLDABLE FAN

CROSS-REFERENCE TO RELATED APPLICATIONS

This application claims priority to Chinese Patent Application No. 202411945467.3, filed on Dec. 27, 2024, which is incorporated herein by reference in its entirety.

TECHNICAL FIELD

The present disclosure relates to the technical field of fans, and specifically relates to a rotary locking structure and a foldable fan.

BACKGROUND

For the convenience of packaging and storage, fans in the prior art are often designed to be foldable, typically employing a rotational folding mechanism, wherein the base can rotate relative to the support. Since users have the need to adjust the positioning angle of the fan, the rotation between the base and the support should also be capable of locking at a specific angle. For example, a patent document with the publication number CN216922578U discloses a foldable and telescopic fan, wherein an adjusting groove similar to gear teeth is formed in a through hole of the adjusting seat, a spring-driven limiting table is arranged on the driving rod, and the limiting table is pushed into the adjusting groove through the spring to achieve locking. However, in the components related to rotational locking, the spring and the limiting table need to be installed radially, while other main components are assembled axially, making the installation process less straightforward.

SUMMARY

The embodiments of the present disclosure provide a rotary locking structure and a foldable fan to address the issues of poor structural design and inconvenient installation process in the rotary locking structure of foldable fans in the prior art.

To achieve the aforementioned objectives, the embodiments of the present disclosure adopt the following technical solutions:

A rotary locking structure, comprising a rotating seat, a fixed seat, a fixed lining ring, an elastic lining ring and a rotating rod, wherein one end of the rotating seat is provided with a first socket cylinder, the fixed seat is provided with a sleeve, and one end of the sleeve is fixedly connected to a second socket cylinder coaxial with the sleeve;

the rotating rod comprises a rod body and a rod seat which are fixedly connected, the rod body and the rod seat are both cylindrical, and the rod body and the rod seat are coaxial;

when the rotary locking structure is mounted, the elastic lining ring passes through the rod body and is fixedly mounted on the rod seat, the fixed lining ring is fixedly mounted in the second socket cylinder, the rod body passes through the fixed lining ring and the sleeve and is inserted into the first socket cylinder, and is relatively fixed to the first socket cylinder;

a plurality of supporting bridges evenly distributed around an axis of the elastic lining ring are formed on the elastic lining ring, the supporting bridges protrude and are close to the fixed lining ring, and the supporting bridges are arranged to generate elastic deformation in an axis direction of the elastic lining ring; and a number of the supporting bridges is even, locking clamping seats protruding towards the fixed lining ring are formed on two centrally symmetric supporting bridges, an outer contour of one of the locking clamping seats is arc-shaped, two sets of locking hole sets are centrally symmetrically arranged around an axis of the fixed lining ring on the fixed lining ring, each locking hole set comprises a plurality of locking holes distributed at equal intervals, and one of the locking holes is configured to be embedded with one of the locking clamping seats.

Further, two first positioning holes are centrally symmetrically provided around the axis of the fixed lining ring on the fixed lining ring, and a first positioning seat corresponding to a position and number of the first positioning holes is provided on an inner bottom surface of the second socket cylinder.

Further, a fitting slope surface is formed at one end of the rod body away from the rod seat, so that a cross section of the rod body at the fitting slope surface is non-circular; and an inner side of the first socket cylinder is provided with a plurality of fixed teeth in a surrounding manner, and a contour enclosed by the plurality of fixed teeth matches a cross-sectional profile of the rod body at the fitting slope surface.

Further, a plurality of first fixing holes are formed in an inner bottom of the first socket cylinder in a penetrating manner, and a plurality of second fixing holes are formed in one end of the rod body away from the rod seat.

Further, a fixed table protruding towards the rod seat is formed between two adjacent supporting bridges on the elastic lining ring, a second positioning hole is provided in the fixed table, and a second positioning seat corresponding to a position and number of the second positioning hole is provided on the rod seat.

Further, at least one supporting bridge is provided with a third positioning hole, and a third positioning seat corresponding to a position and number of the third positioning hole is further provided on the rod seat.

A foldable fan, comprising a base, a support, a fan body and the aforementioned rotary locking structure, wherein the support is formed by assembling an arc-shaped frame and two cantilevers into a U shape;

one rotary locking structure is mounted on each of two sides of the base, a fixed seat is fixedly mounted inside the base, and a rotating seat is fixedly connected to one end of one of the cantilevers away from the arc-shaped frame; and two sides of the fan body are respectively rotatably connected to the two cantilevers of the support, and a mounting position of the fan body is close to the arc-shaped frame.

Further, one of the cantilevers comprises a first cantilever and a second cantilever, the first cantilever is hollow, so that the second cantilever is arranged to be inserted into the first cantilever and move in a length direction of the first cantilever, thereby enabling telescoping of one of the cantilevers.

The beneficial effects of the present disclosure are:

In the present disclosure, through the cooperation of the elastic lining ring and the fixed lining ring, it is possible to achieve locking while enabling the adjustment of the relative positions of the fixed seat and the rotating seat, and the assembly can be completed simply by axial assembly, making the installation process straightforward.

DETAILED DESCRIPTION OF THE EMBODIMENTS

Embodiments of the present disclosure will be described in detail below with reference to the accompanying drawings. It should be understood that the embodiments described here are only used to illustrate and explain the present disclosure, and are not intended to limit the present disclosure.

Figure 1:
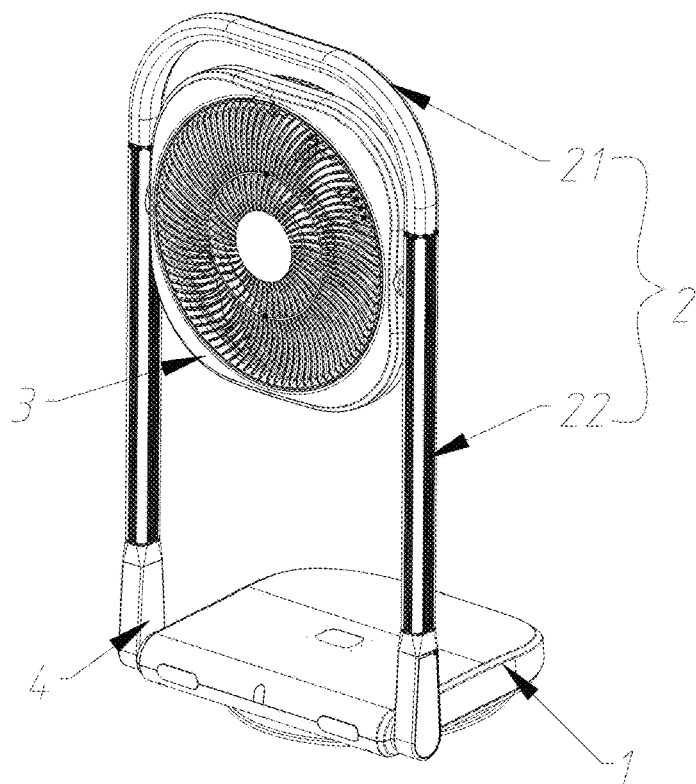
FIG. 1 is a perspective view of a foldable fan.
Figure 2:
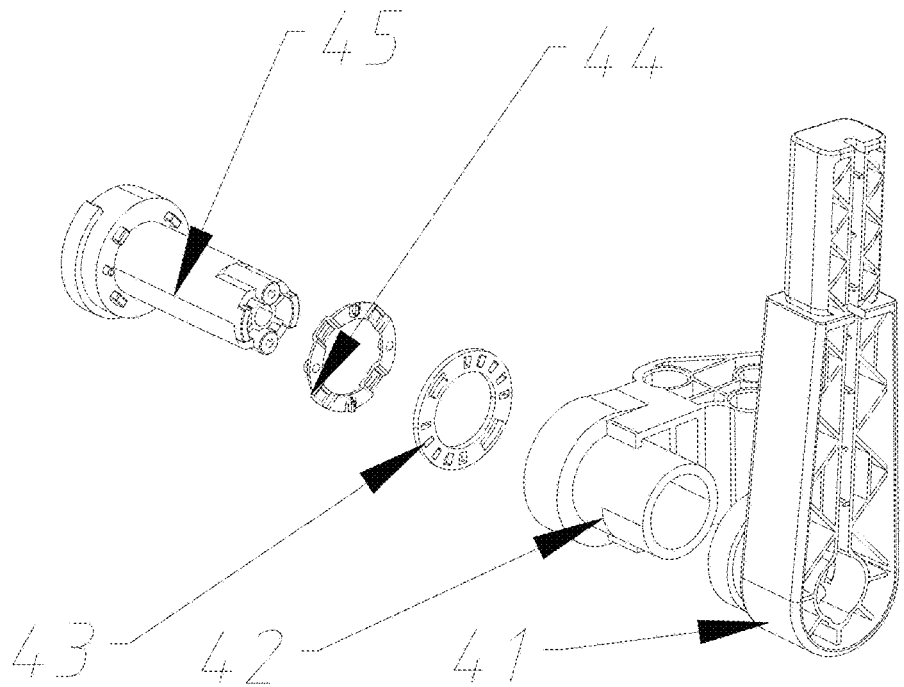
FIG. 2 is an exploded view of a rotary locking structure.
Figure 3:
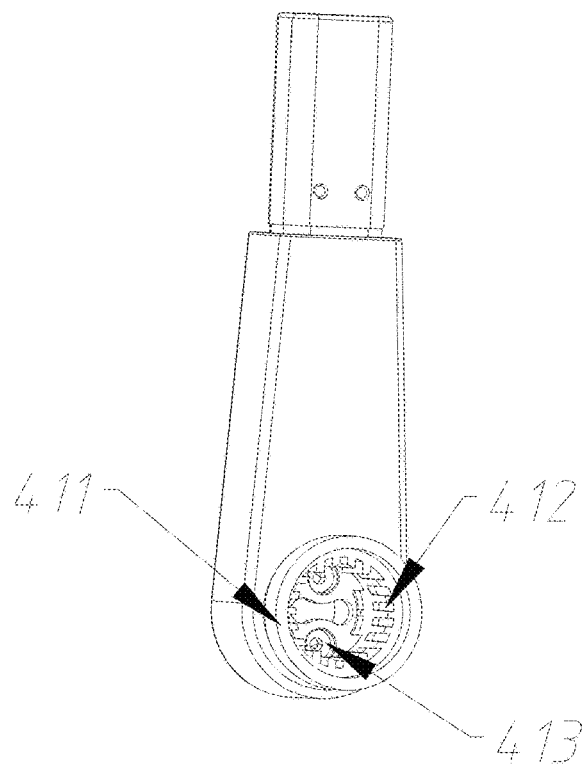
FIG. 3 is a perspective view of a rotating seat.
Figure 4:
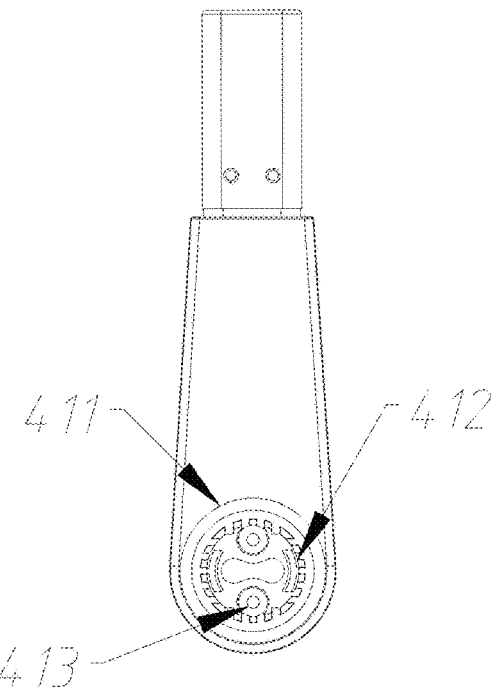
FIG. 4 is a side view of the rotating seat.
Figure 5:
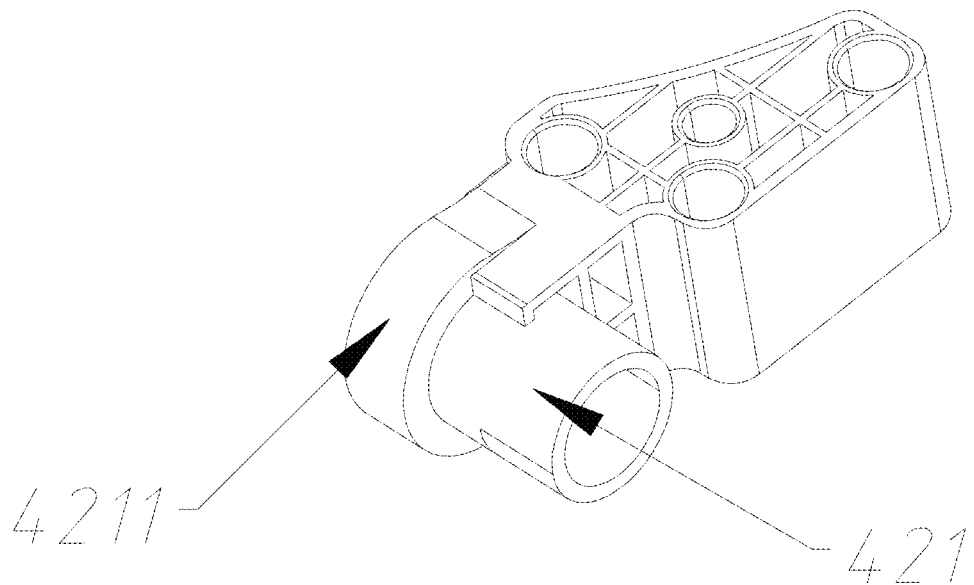
FIG. 5 is a perspective view of a fixed seat.
Figure 6:
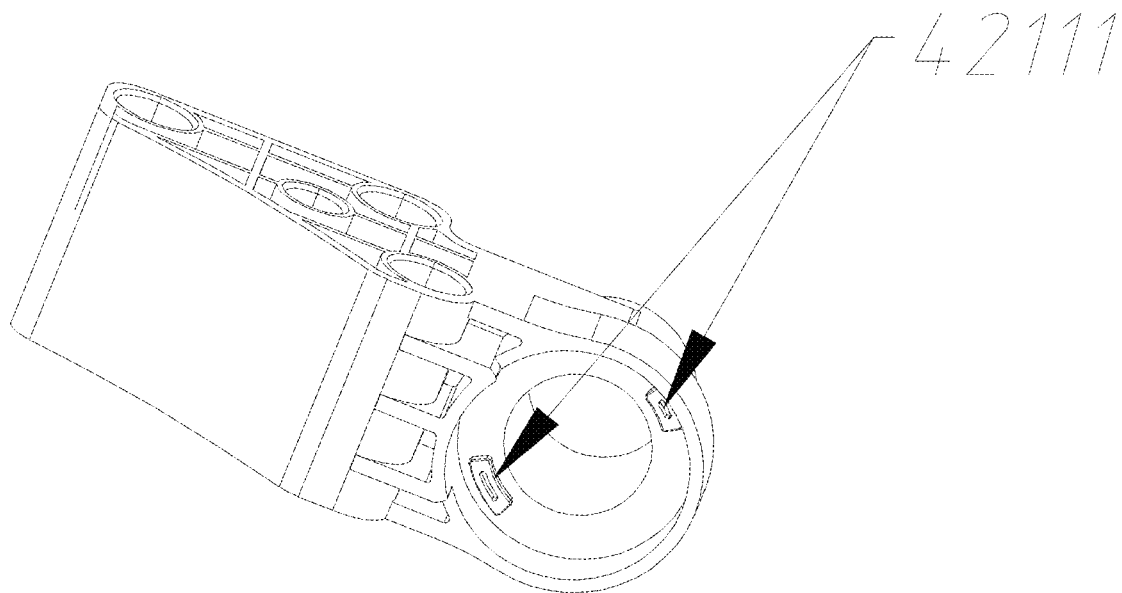
FIG. 6 is a perspective view of the fixed seat from another angle.
Figure 7:
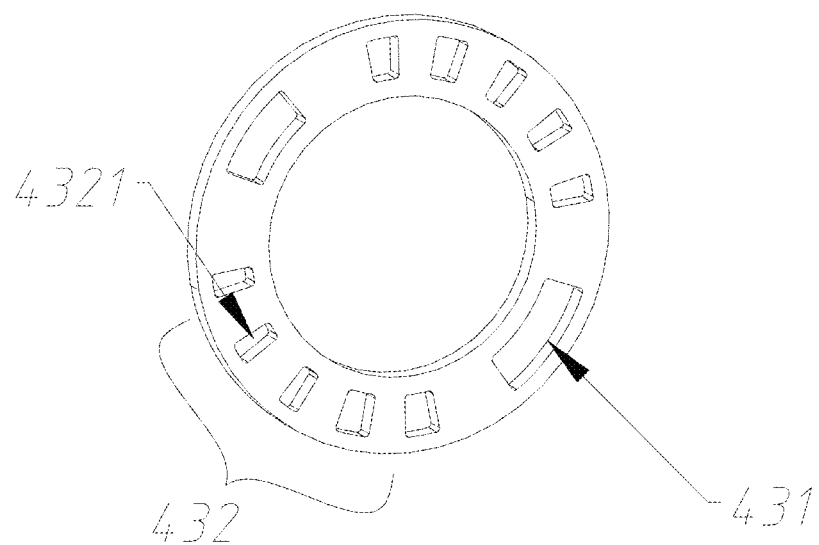
FIG. 7 is a perspective view of a fixed lining ring.
Figure 8:
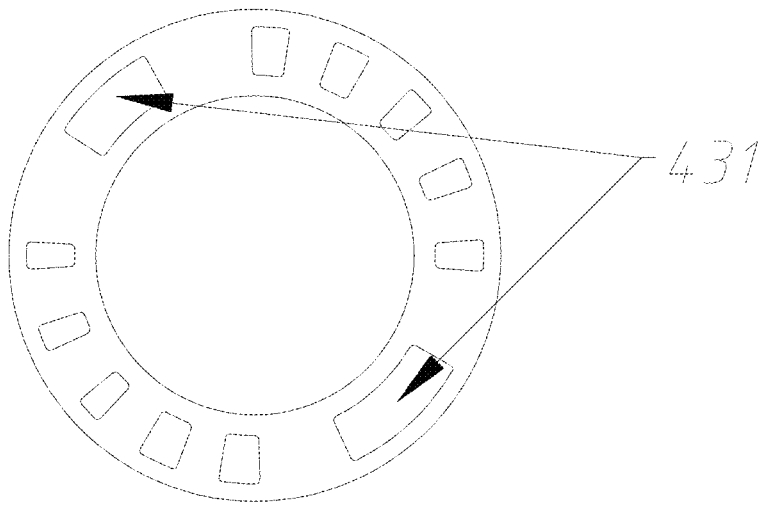
FIG. 8 is a side view of the fixed lining ring.
Figure 9:
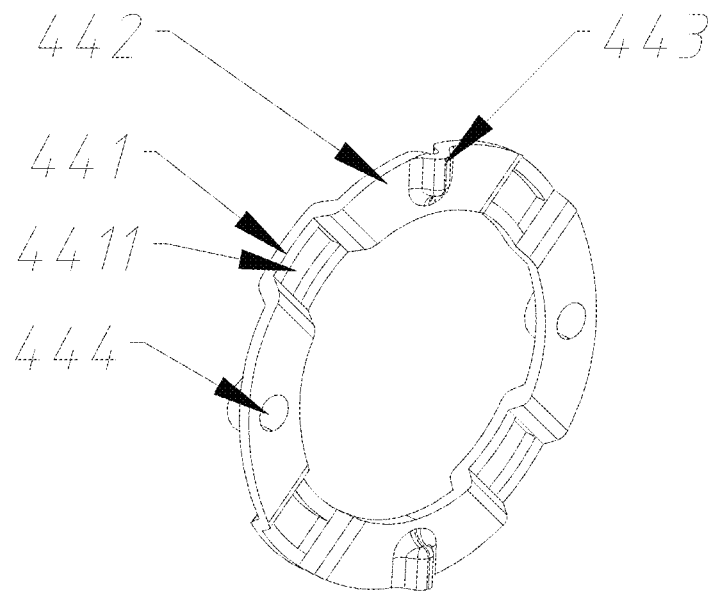
FIG. 9 is a perspective view of an elastic lining ring.
Figure 10:
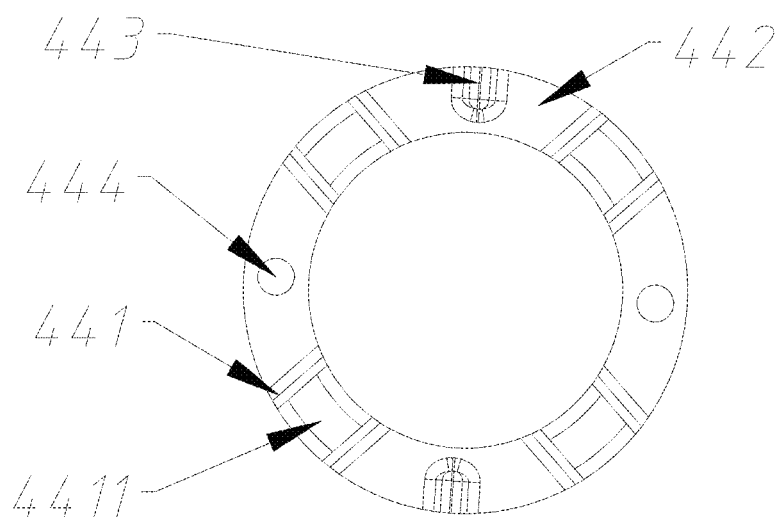
FIG. 10 is a side view of the elastic lining ring.
Figure 11:
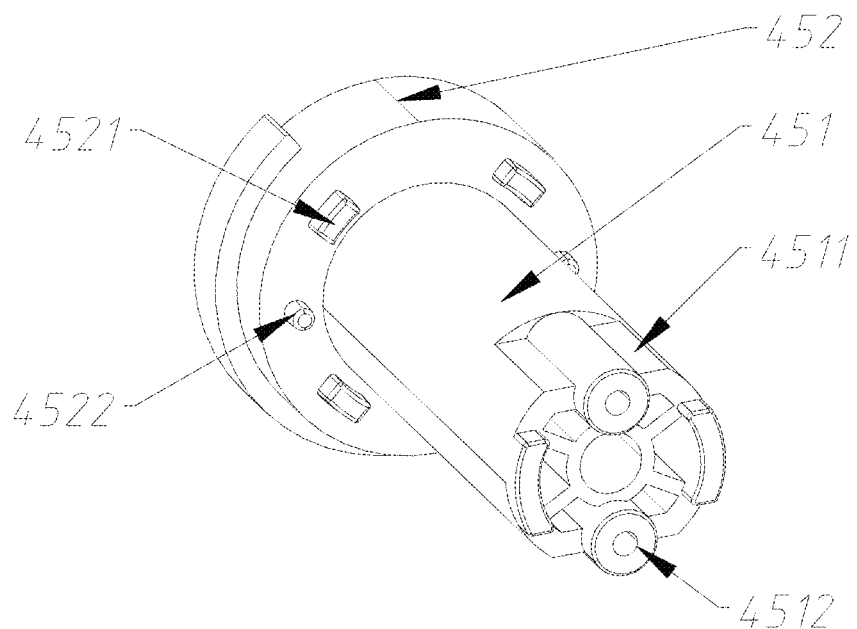
FIG. 11 is a perspective view of a rotating rod.
Figure 12:
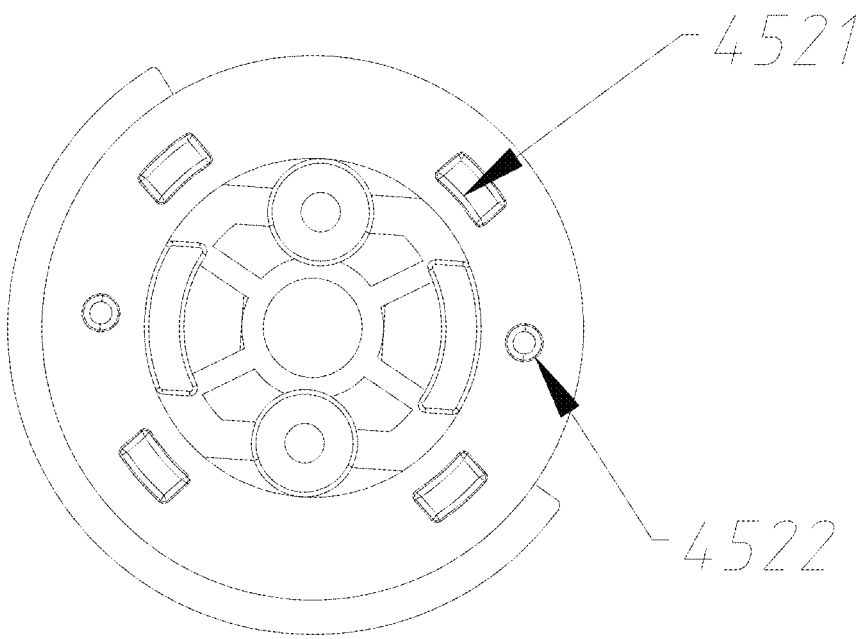
FIG. 12 is a side view of the rotating rod.
Figure 13:
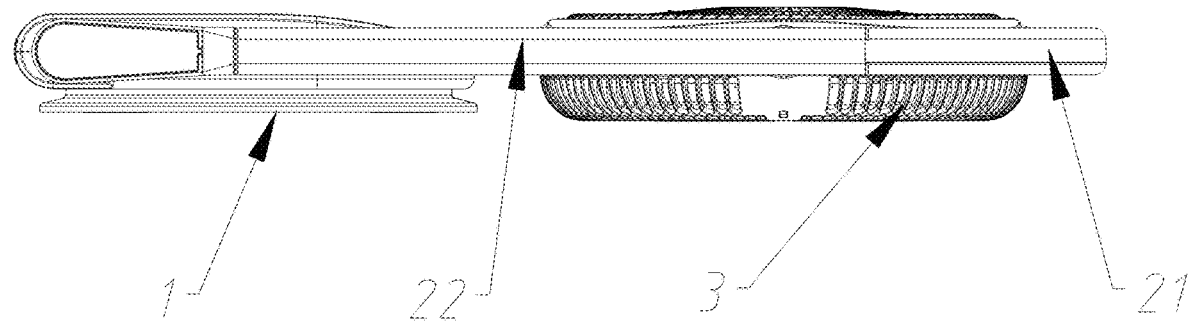
FIG. 13 is a schematic diagram of a fully folded foldable fan.

As shown in FIG. 1, an embodiment of the present disclosure provides a foldable fan. The foldable fan comprises a base 1, a support 2, a fan body 3 and a rotary locking structure 4, wherein the support 2 is formed by assembling an arc-shaped frame 21 and two cantilevers 22 into a U shape. One rotary locking structure 4 is mounted on each of two sides of the base 1, and one end of each cantilever 22 away from the arc-shaped frame 21 is rotatably connected to the rotary locking structure 4, so that the support 2 can rotate around the base 1. Two sides of the fan body 3 are respectively rotatably connected to the two cantilevers 22 of the support 2, and a mounting position of the fan body 3 is close to the arc-shaped frame 21. Through the design that the support 2 can rotate around the base 1, combined with the design that the fan body 3 can rotate within the support 2, the folding of the foldable fan is achieved. As shown in FIG. 13, in the fully folded state, both the base 1 and the fan body 3 can be rotated to be parallel to the extending direction of the cantilevers 22, thereby facilitating storage.

As shown in FIGS. 2-12, an embodiment of the present disclosure provides a rotary locking structure 4. The rotary locking structure 4 comprises a rotating seat 41, a fixed seat 42, a fixed lining ring 43, an elastic lining ring 44 and a rotating rod 45. The rotating seat 41 is configured to connect to the support 2 of the foldable fan (specifically, the rotating seat 41 connects to one end of one of the cantilevers 22 away from the arc-shaped frame 21), and one end of the rotating seat 41 is provided with a first socket cylinder 411. The fixed seat 42 is configured to be fixedly installed in the base 1, the fixed seat 42 is provided with a sleeve 421, and one end of the sleeve 421 is fixedly connected to a second socket cylinder 4211 coaxial with the sleeve 421. The rotating rod 45 comprises a rod body 451 and a rod seat 452 which are fixedly connected, the rod body 451 and the rod seat 452 are both cylindrical, and the rod body 451 and the rod seat 452 are coaxial.

When the rotary locking structure 4 is mounted, the elastic lining ring 44 passes through the rod body 451 and is fixedly mounted on the rod seat 452 (the rod seat 452 and the elastic lining ring 44 cannot rotate relative to each other), the fixed lining ring 43 is fixedly mounted in the second socket cylinder 4211 (the fixed lining ring 43 and the second socket cylinder 4211 cannot rotate relative to each other), the rod body 451 passes through the fixed lining ring 43 and the sleeve 421 and is inserted into the first socket cylinder 411, and is relatively fixed to the first socket cylinder 411 (at this point, the rod body 451, the elastic lining ring 44, the fixed lining ring 43, the sleeve 421 and the first socket cylinder 411 are coaxial).

As the main improvement of the present disclosure, a plurality of supporting bridges 442 evenly distributed around an axis of the elastic lining ring 44 are formed on the elastic lining ring 44, the supporting bridges 442 protrude and are close to the fixed lining ring 43, and it is evident that the supporting bridges 442 are arranged to generate elastic deformation in an axis direction of the elastic lining ring 44. A number of the supporting bridges 442 is even (in a preferred embodiment, four supporting bridges 442 are formed on the elastic lining ring 44), locking clamping seats 443 protruding towards the fixed lining ring 43 are formed on two centrally symmetric supporting bridges 442, an outer contour of one of the locking clamping seats 443 is arc-shaped, two sets of locking hole sets 432 are centrally symmetrically arranged around an axis of the fixed lining ring 43 on the fixed lining ring 43, each locking hole set 432 comprises a plurality of locking holes 4321 distributed at equal intervals, and one of the locking holes 4321 is configured to be embedded with one of the locking clamping seats 443.

In the assembled state, in the rotary locking structure 4 provided by the present disclosure, one of the locking clamping seats 443 embedded with one of the locking holes 4321, preventing relative rotation between the elastic lining ring 44 and the fixed lining ring 43. However, the supporting bridges 442 are arranged to generate elastic deformation in the axis direction of the elastic lining ring 44, and the outer contour of one of the locking clamping seats 443 is arc-shaped, when an external force is applied to drive relative torsion between the elastic lining ring 44 and the fixed lining ring 43, one of the supporting bridges 442 is compressed in the axial direction of the elastic lining ring 44 as a result of the squeezing force exerted by one of the locking clamping seats 443. This allows one of the locking clamping seats 443 to disengage from one of the locking holes 4321 and slide into another adjacent locking hole 4321 within the locking hole set 432. Upon cessation of the external force, the relative position between the elastic lining ring 44 and the fixed lining ring 43 is fixed again. In the rotary locking structure 4 of the present disclosure, through the cooperation of the elastic lining ring 44 and the fixed lining ring 43, not only can the relative position adjustment between the fixed seat 42 and the rotating seat 41 be achieved, but also locking can be realized. Furthermore, the assembly can be completed simply by axial assembly, making the installation process straightforward.

Specifically, to achieve the fixation between the fixed lining ring 43 and the second socket cylinder 4211, two first positioning holes 431 are centrally symmetrically provided around the axis of the fixed lining ring 43 on the fixed lining ring 43, and a first positioning seat 42111 corresponding to a position and number of the first positioning holes 431 is provided on an inner bottom surface of the second socket cylinder 4211 (it is noted that, the positions of the first positioning holes 431 are staggered from those of the locking hole set 432).

Specifically, to achieve the fixation between the rotating rod 45 and the first socket cylinder 411, a fitting slope surface 4511 is formed at one end of the rod body 451 away from the rod seat 452, so that a cross section of the rod body 451 at the fitting slope surface 4511 is non-circular. An inner side of the first socket cylinder 411 is provided with a plurality of fixed teeth 412 in a surrounding manner, and a contour enclosed by the plurality of fixed teeth 412 matches a cross-sectional profile of the rod body 451 at the fitting slope surface 4511, allowing the rod body 451 to be inserted and installed into the first socket cylinder 411, and preventing relative rotation between the rod body 451 and the first socket cylinder 411.

Further, to reinforce the fixed connection between the rod body 451 and the first socket cylinder 411, a plurality of first fixing holes 413 are formed in an inner bottom of the first socket cylinder 411 in a penetrating manner, and a plurality of second fixing holes 4512 are formed in one end of the rod body 451 away from the rod seat 452. After the rod body 451 is inserted and installed into the first socket cylinder 411, fasteners such as bolts or screws are inserted through the first fixing holes 413 and into the second fixing holes 4512 to fix the relative positions of the rod body 451 and the first socket cylinder 411.

Specifically, to achieve the fixation between the elastic lining ring 44 and the rod seat 452, a fixed table 441 protruding towards the rod seat 452 is formed between two adjacent supporting bridges 442 on the elastic lining ring 44, a second positioning hole 4411 is provided in the fixed table 441, and a second positioning seat 4521 corresponding to a position and number of the second positioning hole 4411 is provided on the rod seat 452. The fixation between the elastic lining ring 44 and the rod seat 452 is achieved by inserting the second positioning seat 4521 into the second positioning hole 4411.

Further, to ensure a consistent relative position between the elastic lining ring 44 and the rod seat 452 during repeated assemblies, at least one supporting bridge 442 is provided with a third positioning hole 444, and a third positioning seat 4522 corresponding to a position and number of the third positioning hole 444 is further provided on the rod seat 452. By inserting the third positioning seat 4522 into the third positioning hole 444, a consistent relative position between the elastic lining ring 44 and the rod seat 452 during repeated assemblies is achieved.

Figure 14:
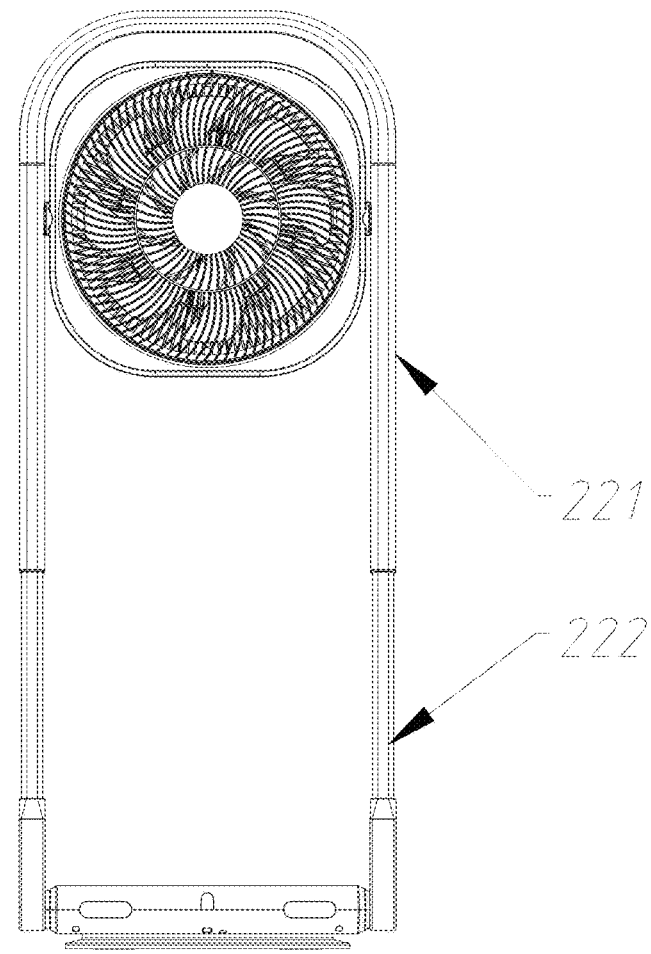
FIG. 14 is a front view of a foldable fan with the cantilever in the extended position.
Figure 15:
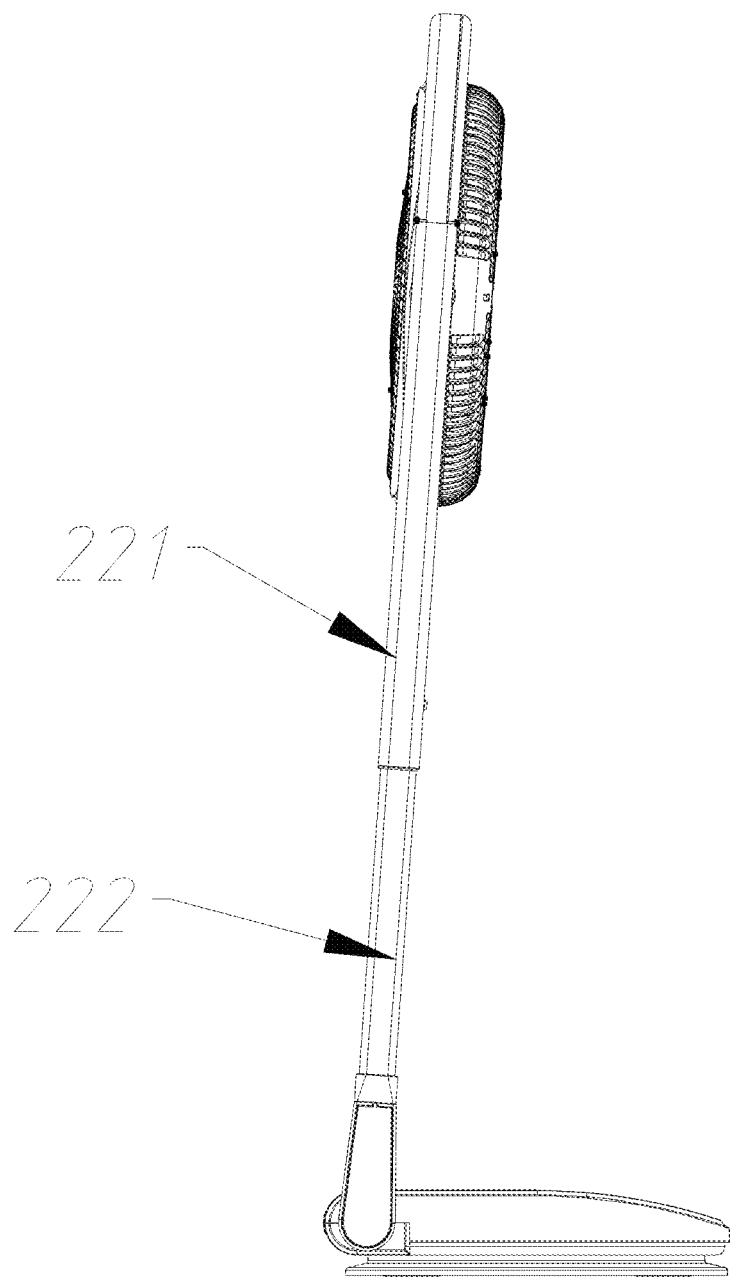
FIG. 15 is a side view of a foldable fan with the cantilever in the extended position.

Additionally, considering the height adjustment requirements of the fan body 3 in the usage scenario of the foldable fan, as shown in FIGS. 13-15, in an improved embodiment of the foldable fan of the present disclosure, the cantilevers 22 are designed to be telescopic. One of the cantilevers 22 comprises a first cantilever 221 and a second cantilever 222, the first cantilever 221 is hollow, so that the second cantilever 222 is arranged to be inserted into the first cantilever 221 and move in a length direction of the first cantilever 221, thereby enabling telescoping of one of the cantilevers 22 to adjust the height of the fan body 3.

The above-described embodiments only express embodiments of the present disclosure, but should not be construed as limiting the patent scope of the present disclosure. It should be noted that, for those of ordinary skill in the art, several modifications and improvements can be made without departing from the concept of the present disclosure, and these all belong to the protection scope of the present disclosure. Therefore, the scope of protection of the patent of the present disclosure should be determined by the appended claims.

The invention claimed is:

1. A rotary locking structure, comprising a rotating seat, a fixed seat, a fixed lining ring, an elastic lining ring and a rotating rod, wherein one end of the rotating seat is provided with a first socket cylinder, the fixed seat is provided with a sleeve, and one end of the sleeve is fixedly connected to a second socket cylinder coaxial with the sleeve;

the rotating rod comprises a rod body and a rod seat which are fixedly connected, the rod body and the rod seat are both cylindrical, and the rod body and the rod seat are coaxial;

when the rotary locking structure is mounted, the elastic lining ring passes over the rod body and is fixedly mounted on the rod seat, the fixed lining ring is fixedly mounted in the second socket cylinder, the rod body passes through the fixed lining ring and the sleeve and is inserted into the first socket cylinder, and is relatively fixed to the first socket cylinder;

a plurality of supporting bridges evenly distributed around an axis of the elastic lining ring are formed on the elastic lining ring, the supporting bridges protrude and are close to the fixed lining ring, and the supporting bridges are arranged to generate elastic deformation in an axis direction of the elastic lining ring; and a number of the supporting bridges is even, locking clamping seats protruding towards the fixed lining ring are formed on two centrally symmetric supporting bridges, an outer contour of one of the locking clamping seats is arc-shaped, two sets of locking hole sets are centrally symmetrically arranged around an axis of the fixed lining ring on the fixed lining ring, each locking hole set comprises a plurality of locking holes distributed at equal intervals, and one of the locking holes is configured to be embedded with one of the locking clamping seats.

2. The rotary locking structure according to claim 1, wherein two first positioning holes are centrally symmetrically provided around the axis of the fixed lining ring on the fixed lining ring, and a first positioning seat corresponding to a position and number of the first positioning holes is provided on an inner bottom surface of the second socket cylinder.

3. The rotary locking structure according to claim 1, wherein a fitting slope surface is formed at one end of the rod body away from the rod seat, so that a cross section of the rod body at the fitting slope surface is non-circular; and an inner side of the first socket cylinder is provided with a plurality of fixed teeth in a surrounding manner, and a contour enclosed by the plurality of fixed teeth matches a cross-sectional profile of the rod body at the fitting slope surface.

4. The rotary locking structure according to claim 3, wherein a plurality of first fixing holes are formed in an inner bottom of the first socket cylinder in a penetrating manner, and a plurality of second fixing holes are formed in one end of the rod body away from the rod seat.

5. The rotary locking structure according to claim 1, wherein a fixed table protruding towards the rod seat is formed between two adjacent supporting bridges on the elastic lining ring, a second positioning hole is provided in the fixed table, and a second positioning seat corresponding to a position and number of the second positioning hole is provided on the rod seat.

6. The rotary locking structure according to claim 5, wherein at least one of the supporting bridges is provided with a third positioning hole, and a third positioning seat corresponding to a position and number of the third positioning hole is further provided on the rod seat.

7. A foldable fan, comprising a base, a support, a fan body and the rotary locking structure according to claim 1, wherein the support is formed by assembling an arc-shaped frame and two cantilevers into a U shape;

- one rotary locking structure is mounted on each of two sides of the base, a fixed seat is fixedly mounted inside the base, and a rotating seat is fixedly connected to one end of one of the cantilevers away from the arc-shaped frame; and
- two sides of the fan body are respectively rotatably connected to the two cantilevers of the support, and a mounting position of the fan body is close to the arc-shaped frame.

8. The foldable fan according to claim 7, wherein one of the cantilevers comprises a first cantilever and a second cantilever, the first cantilever is hollow, so that the second cantilever is arranged to be inserted into the first cantilever and move in a length direction of the first cantilever, thereby enabling telescoping of one of the cantilevers.

* * * * *